(12) United States Patent
Liu et al.

(10) Patent No.: US 12,549,309 B2
(45) Date of Patent: Feb. 10, 2026

(54) PHASE TRACKING REFERENCE SIGNAL FOR SFN BASED PDSCH TRANSMISSION

(71) Applicant: LENOVO (BEIJING) LIMITED, Beijing (CN)

(72) Inventors: Bingchao Liu, Beijing (CN); Chenxi Zhu, Fairfax, VA (US); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 368 days.

(21) Appl. No.: 18/026,792

(22) PCT Filed: Sep. 18, 2020

(86) PCT No.: PCT/CN2020/116199
§ 371 (c)(1),
(2) Date: Mar. 16, 2023

(87) PCT Pub. No.: WO2022/056838
PCT Pub. Date: Mar. 24, 2022

(65) Prior Publication Data
US 2023/0403115 A1    Dec. 14, 2023

(51) Int. Cl.
*H04L 5/00* (2006.01)
*H04B 7/06* (2006.01)
*H04W 72/1273* (2023.01)

(52) U.S. Cl.
CPC ....... *H04L 5/0051* (2013.01); *H04B 7/06968* (2023.05); *H04W 72/1273* (2013.01)

(58) Field of Classification Search
CPC ................. H04L 5/0051; H04L 5/0023; H04L 5/0044; H04L 5/0053; H04W 72/1273; H04B 7/0695; H04B 7/088
See application file for complete search history.

(56) References Cited

U.S. PATENT DOCUMENTS

| | | | |
|---|---|---|---|
| 11,569,954 B2 * | 1/2023 | Zhang | .................. H04L 5/0051 |
| 12,244,529 B2 * | 3/2025 | Kim | ......................... H04L 1/00 |
| 2019/0141693 A1 | 5/2019 | Guo et al. | |
| 2019/0296876 A1 | 9/2019 | Zhang et al. | |
| 2020/0221435 A1 | 7/2020 | Kim et al. | |
| 2020/0221487 A1 | 7/2020 | Lee et al. | |
| 2020/0296704 A1 | 9/2020 | Vilaipornsawai et al. | |
| 2021/0105166 A1* | 4/2021 | Khoshnevisan | ........ H04W 8/24 |

(Continued)

OTHER PUBLICATIONS

International Searching Authority, "Written Opinion of the International Searching Authority," PCT/CN2020/1116199, Jun. 3, 2021, pp. 1-3.

*Primary Examiner* — Ivan O Latorre
(74) *Attorney, Agent, or Firm* — Kunzler Needham & Hilton

(57) ABSTRACT

Methods and apparatuses for determining phase tracking reference signal (PT-RS) for single frequency network (SFN) based PDSCH transmission are disclosed. A method comprises determining, for each of two PT-RS ports for SFN based PDSCH transmission, an associated DM-RS port with an indicated TCI state, wherein, one or multiple PDSCH layers are scheduled for the SFN based PDSCH transmission; determining, for each of the two PT-RS ports, an RE index in the RB containing PT-RS resources; and receiving the two PT-RS ports associated with two TCI states.

20 Claims, 8 Drawing Sheets

(56) References Cited

U.S. PATENT DOCUMENTS

| | | | |
|---|---|---|---|
| 2022/0077982 A1* | 3/2022 | Zhang | H04L 5/0053 |
| 2022/0078058 A1* | 3/2022 | Horn | H04L 1/0061 |
| 2022/0116256 A1* | 4/2022 | Shahmohammadian | H04L 27/2675 |
| 2022/0385427 A1* | 12/2022 | Frenne | H04L 5/0051 |
| 2023/0130150 A1* | 4/2023 | Shahmohammadian | H04L 5/0053 370/329 |
| 2023/0179279 A1* | 6/2023 | Huang | H04B 17/345 370/252 |
| 2023/0216627 A1* | 7/2023 | Wang | H04B 7/063 370/329 |
| 2023/0328569 A1* | 10/2023 | Khoshnevisan | H04B 7/0639 370/252 |
| 2023/0403115 A1* | 12/2023 | Liu | H04L 5/0053 |

\* cited by examiner

PHASE TRACKING REFERENCE SIGNAL FOR SFN BASED PDSCH TRANSMISSION

FIELD

The subject matter disclosed herein generally relates to wireless communications, and more particularly relates to methods and apparatuses for determining phase tracking reference signal (PT-RS) for single frequency network (SFN) based PDSCH transmission.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal) (UE), Downlink control information (DCI), Reference Signal (RS), Phase Tracking Reference Signal (PT-RS), Single Frequency Network (SFN), Physical Downlink Shared Channel (PDSCH), Physical Downlink Control Channel (PDCCH), Transmission and Reception Point (TRP), Demodulation Reference Signal (DM-RS), quasi co-location (QCL), quasi co-located (QCLed), Tracking Reference Signal (TRS), Frequency Range 2 (FR2), Multiple-Input Multiple-Output (MIMO), Transmission Configuration Indication (TCI), receiver (RX), Radio-Network Temporary Identifier (RNTI), Radio Resource Control (RRC), Code Division Multiplexing (CDM).

SFN based PDCCH or PDSCH transmission is a very useful DL transmission scheme for coverage enhancement. It may be widely used in multi-TRP scenario, especially for UE with high mobility. In SFN based PDSCH transmission, each PDSCH layer is transmitted from multiple TRPs (e.g. TRP #1 and TRP #2) by using a single frequency network (SFN) manner (i.e. using the same time-frequency resources). In SFN based PDSCH transmission, the DM-RS used for channel measurement can be transmitted in a SFN DM-RS scheme or a non-SFN DM-RS scheme.

FIG. 1(a) illustrates a principle of SFN based PDSCH transmission adopting a SFN DM-RS scheme. A single DM-RS port (e.g. DM-RS port 0) is QCLed with two TRS resources (e.g. TRS #1 and TRS #2) for frequency and timing tracking, where TRS #1 is a tracking RS for TRP #1 and TRS #2 is a tracking RS for TRP #2. As shown in FIG. 1(a), one PDSCH layer (e.g. PDSCH layer #1) transmitted from different TRPs (i.e. TRP #1 and TRP #2) are associated with the same DM-RS port (i.e. DM-RS port 0).

FIG. 1(b) illustrates a principle of SFN based PDSCH transmission adopting a non-SFN DM-RS scheme. Two DM-RS ports (e.g., DM-RS port 0 and DM-RS port 1) are respectively QCLed with two TRS resources (e.g., TRS #1 and TRS #2). Each DM-RS port is QCLed with a TRS transmitted from the same TRP for frequency and timing tracking. That is, DM-RS port 0 is QCLed with TRS #1 from TRP #1 while DM-RS port 1 is QCLed with TRS #2 from TRP #2. As shown in FIG. 1(b), one PDSCH layer (e.g. PDSCH layer #1) transmitted from different TRPs (i.e. TRP #1 and TRP #2) are associated with two DM-RS ports (e.g., DM-RS port 0 and DM-RS port 1). That is, PDSCH layer #1 transmitted from TRP #1 is associated with DM-RS port 0, while PDSCH layer #1 transmitted from TRP #2 is associated with DM-RS port 1.

Phase tracking reference signal (PT-RS) is introduced in FR2 for phase noise estimation. In a scenario of multi-TRP (e.g. two TRPs), the phase noises corresponding to different links from different TRPs are totally independent. However, the issue on the phase noise estimation for SFN-PDSCH scheme by a single or multiple PT-RS ports is not touched yet.

This invention discloses methods and apparatuses for determining phase tracking reference signal (PT-RS) for single frequency network (SFN) based PDSCH transmission.

BRIEF SUMMARY

Methods and apparatuses for determining phase tracking reference signal (PT-RS) for single frequency network (SFN) based PDSCH transmission are disclosed.

In one embodiment, a method comprises determining, for each of two PT-RS ports for SFN based PDSCH transmission, an associated DM-RS port with an indicated TCI state, wherein, one or multiple PDSCH layers are scheduled for the SFN based PDSCH transmission; determining, for each of the two PT-RS ports, an RE index in the RB containing PT-RS resources; and receiving the two PT-RS ports associated with two TCI states.

In one embodiment, in the non-SFN DM-RS scheme, when the associated DM-RS port is associated with one indicated TCI state, a first PT-RS port in the two PT-RS ports is associated with the DM-RS port having the lowest port index among the DM-RS port(s) assigned for the one or multiple PDSCH layers associated with a first indicated TCI state, a second PT-RS port in the two PT-RS ports is associated with the DM-RS port having the lowest port index among the DM-RS port(s) assigned for the one or multiple PDSCH layers associated with a second indicated TCI state.

In another embodiment, in the SFN DM-RS scheme, when the associated DM-RS port is associated with two indicated TCI states, a first PT-RS port and a second PT-RS port in the two PT-RS ports are both associated with the DM-RS port having the lowest port index among the DM-RS port(s) assigned for the one or multiple PDSCH layers, the first PT-RS port and the associated DM-RS port are assumed to be quasi co-located with respect to {'QCL-TypeA' and 'QCL-TypeD'} indicated by a first TCI state in the two indicated TCI states, and the second PT-RS port and the associated DM-RS port are assumed to be quasi co-located with respect to {'QCL-TypeA' and 'QCL-TypeD'} indicated by a second TCI state in the two indicated TCI states.

In different embodiments of the SFN DM-RS scheme, the RE index can be determined differently in different situations. In a first situation, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by the DM-RS port having the second lowest port index among the DM-RS ports assigned for the two or multiple PDSCH layers. Alternatively in the first situation, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by a DM-RS port within the same CDM group as the DM-RS port having the lowest port index among the DM-RS ports assigned for the two or multiple PDSCH layers. In a second situation, when one PDSCH layer is scheduled, the RE index for a first PT-RS port in the two PT-RS ports is determined by the DM-RS port assigned for the one PDSCH layer, and the RE index for a second PT-RS port in the two PT-RS ports is determined by a DM-RS port within the same CDM group as the DM-RS port assigned for the one PDSCH layer.

In some embodiment of the non-SFN DM-RS scheme, the RE index for a first PT-RS port in the two PT-RS ports is determined by the DM-RS port having the lowest port index among the DM-RS port(s) assigned for the one or multiple PDSCH layers associated with the first indicated TCI state, and the RE index for a second PT-RS port in the two PT-RS ports is determined by the DM-RS port having the lowest port index among the DM-RS port(s) assigned for the one or multiple PDSCH layers associated with the second indicated TCI state.

In another embodiment, a remote unit comprises a processor that determines, for each of two PT-RS ports for SFN based PDSCH transmission, an associated DM-RS port with an indicated TCI state and an RE index in the RB containing PT-RS resources, wherein, one or multiple PDSCH layers are scheduled for the SFN based PDSCH transmission; and a receiver that receives the two PT-RS ports associated with two TCI states.

In one embodiment, a method comprises determining, for each of two PT-RS ports for SFN based PDSCH transmission, an associated DM-RS port with an indicated TCI state, wherein, one or multiple PDSCH layers are scheduled for the SFN based PDSCH transmission; determining, for each of the two PT-RS ports, an RE index in the RB containing PT-RS resources; and transmitting the two PT-RS ports associated with two TCI states.

In yet another embodiment, a base unit comprises a processor that determines, for each of two PT-RS ports for SFN based PDSCH transmission, an associated DM-RS port with an indicated TCI state and an RE index in the RB containing PT-RS resources, wherein, one or multiple PDSCH layers are scheduled for the SFN based PDSCH transmission; and a transmitter that transmits the two PT-RS ports associated with two TCI states.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1A:
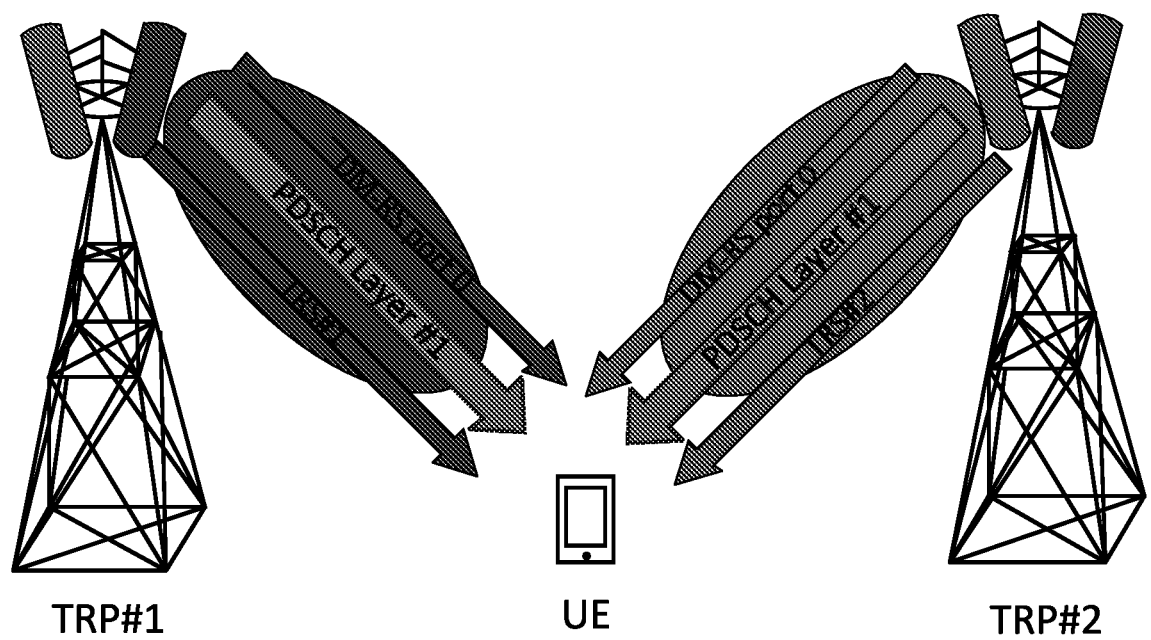
FIG. 1(a) illustrates a principle of SFN based PDSCH transmission adopting a SFN DM-RS scheme.
Figure 1B:
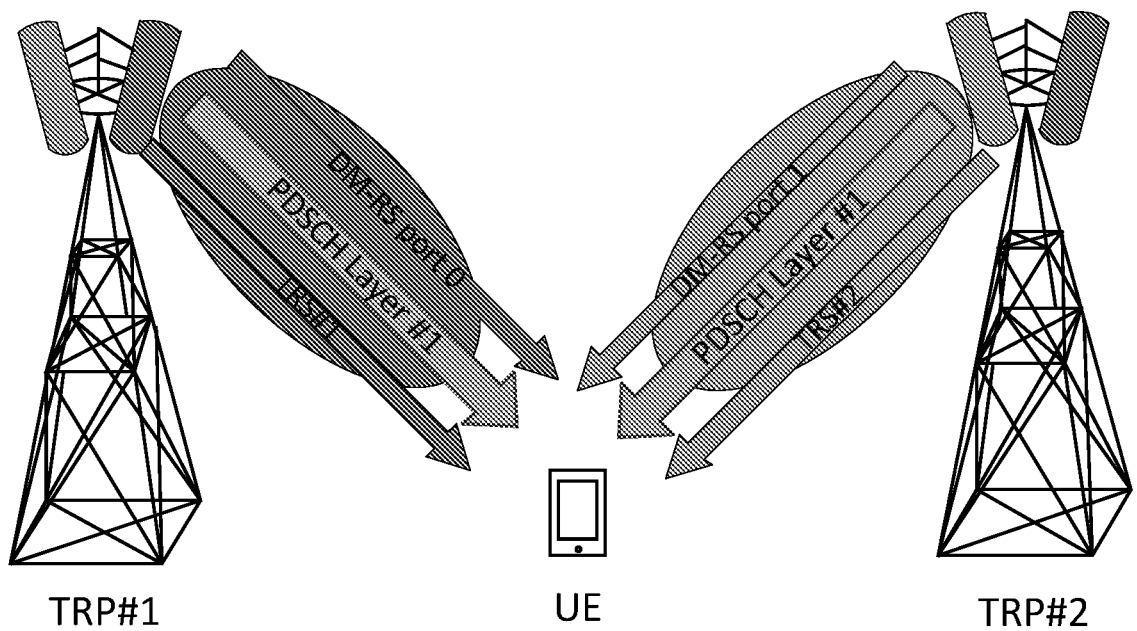
FIG. 1(b) illustrates a principle of SFN based PDSCH transmission adopting a non-SFN DM-RS scheme.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures Like numbers refer to like elements in all figures, including alternate embodiments of like elements.

In a scenario of multiple TRPs, the phase noises from the multiple TRPs to the UE are independent and are almost different. Therefore, the phase noises should be estimated by separate PT-RS antenna ports, in which one PT-RS antenna port is configured for one TRP.

In the following description, the term "antenna port" is abbreviated as "port". That is, "PT-RS antenna port" can be abbreviated as "PT-RS port"; and "DM-RS antenna port" can be abbreviated as "DM-RS port".

The present invention is described by example of two TRPs. In a scenario of two TRPs (e.g. TRP #1 and TRP #2), two PT-RS ports (e.g. PT-RS port 0 and PT-RS port 1) are configured. In particular, PT-RS port 0 is configured for TRP #1, and PT-RS port 1 is configured for TRP #2.

In the scenario of two TRPs (e.g. TRP #1 and TRP #2), two TRSs (e.g. TRS #1 and TRS #2) are configured. In particular, TRS #1 is the tracking reference signal configured for TRP #1, and TRS #2 is the tracking reference signal configured for TRP #2.

In all of the following embodiments, the present invention is described by example of two TRPs, in which two PT-RS ports (e.g. PT-RS port 0 and PT-RS port 1) are configured, and two TRSs (e.g. TRS #1 and TRS #2) are configured.

A SFN based PDSCH transmission is scheduled by a DCI. The number of layers of the scheduled PDSCH transmission is determined by (e.g. equal to) the number of DM-RS ports assigned in the DCI scheduling the PDSCH transmission. That is, one or multiple PDSCH layers can be scheduled for a SFN based PDSCH transmission. Depending on the number of PDSCH layers of the scheduled SFN based PDSCH transmission (i.e. the number of assigned DM-RS ports in the DCI scheduling the SFN based PDSCH transmission) and the DM-RS scheme (SFN DM-RS scheme or non-SFN DM-RS scheme), different embodiments are described.

In a first embodiment, SFN DM-RS scheme is adopted, and the number of PDSCH layers of the scheduled PDSCH transmission is two or multiple (up to six).

Figure 2:
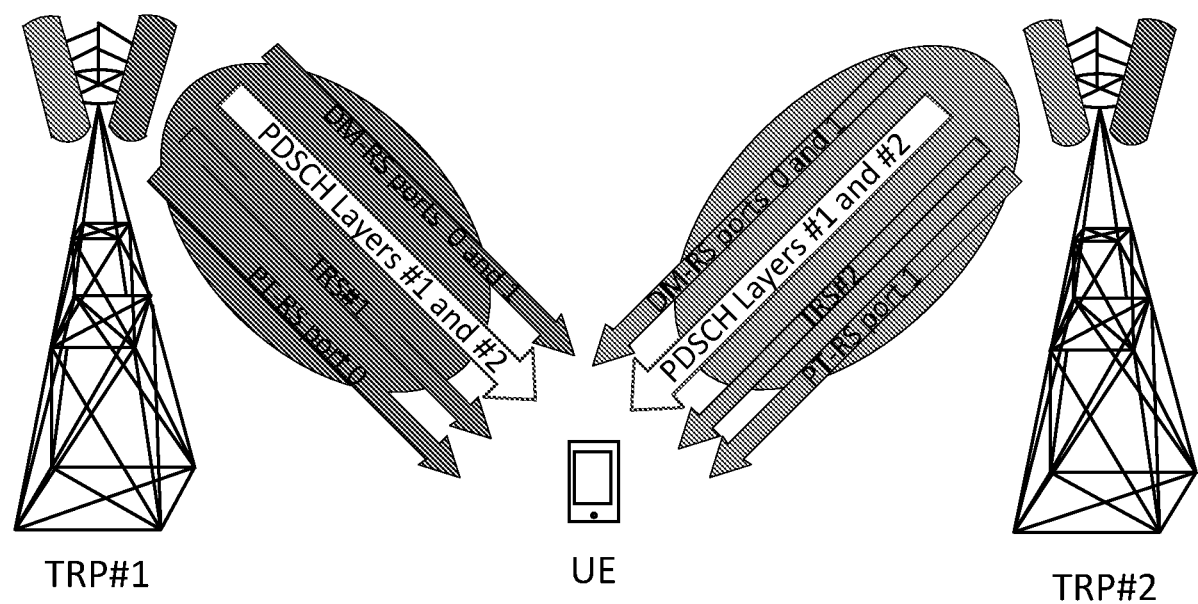
FIG. 2 illustrates an example of the first embodiment.

With reference to FIG. 2, the first embodiment is described by example of two PDSCH layers (e.g. PDSCH layer #1 and PDSCH layer #2) being scheduled.

According to the first embodiment, two PDSCH layers (e.g. PDSCH layer #1 and PDSCH layer #2) are scheduled. Two DM-RS ports (e.g. DM-RS port 0 and DM-RS port 1) are assigned for the two PDSCH layers (i.e. PDSCH layer #1 and PDSCH layer #2). A first DM-RS port (i.e. the DM-RS port with the lowest port index among the two assigned DM-RS ports, e.g. DM-RS port 0) is assigned for a first PDSCH layer (e.g. PDSCH layer #1). A second DM-RS port (i.e. the DM-RS port with the second lowest port index among the two assigned DM-RS ports, e.g. DM-RS port 1) is assigned for a second PDSCH layer (e.g. PDSCH layer #2). Note that the assigned DM-RS ports in the DCI are not limited to DM-RS port 0 and DM-RS port 1. Considering that up to six DM-RS ports (e.g. DM-RS ports 0 to 5) can be configured, if two DM-RS ports are assigned, any two of DM-RS ports 0 to 5 can be assigned. For example, if DM-RS port 1 and DM-RS port 4 are the two assigned DM-RS ports, the assigned DM-RS port with the lowest port index (i.e. DM-RS port 1) is assigned for the first PDSCH layer (i.e. PDSCH layer #1), and the assigned DM-RS port with the second lowest port index (i.e. DM-RS port 4) is assigned for the second PDSCH layer (i.e. PDSCH layer #2).

The following description is described by example of two DM-RS ports (i.e. DM-RS port 0 and DM-RS port 1) configured in the DCI being assigned for two PDSCH layers (i.e. PDSCH layer #1 and PDSCH layer #2), as shown in FIG. 2.

FIG. 2 also shows that two TRSs (e.g. TRS #1 and TRS #2) are configured. In particular, TRS #1 is associated with TRP #1 (i.e. TRS #1 is the tracking RS for TRP #1), and TRS #2 is associated with TRP #2 (i.e. TRS #2 is the tracking RS for TRP #2). In addition, two PT-RS ports (e.g. PT-RS port 0 and PT-RS port 1) are configured. In particular, PT-RS port 0 is associated with TRP #1 (i.e. PT-RS port 0 is for estimating the phase noise for TRP #1), and PT-RS port 1 is associated with TRP #2 (i.e. PT-RS port 1 is for estimating the phase noise for TRP #2).

Each PDSCH layer (each of PDSCH layer #1 and PDSCH layer #2) is transmitted from TRP #1 and TRP #2 by using two different beams.

Each DM-RS port (each of DM-RS port 0 and DM-RS port 1) is also transmitted from TRP #1 and TRP #2 by using two different beams. DM-RS port 0 is assigned for PDSCH layer #1, and DM-RS port 1 is assigned for PDSCH layer #2.

According to the first embodiment, in SFN DM-RS scheme, one PDSCH layer (PDSCH layer #1 or PDSCH layer #2) transmitted from different TRPs are associated with the same DM-RS port. That is, PDSCH layer #1 transmitted from TRP #1 and PDSCH layer #1 transmitted from TRP #2 are associated with DM-RS port 0; and PDSCH layer #2 transmitted from TRP #1 and PDSCH layer #2 transmitted from TRP #2 are associated with DM-RS port 1.

Two TCI states (a first TCI state and a second TCI state) are indicated for each DM-RS port (each of DM-RS port 0 and DM-RS port 1). Each of the two TCI states includes a reference signal for both QCL-TypeA (to obtain the Doppler shift, Doppler spread, average delay and delay spread), and QCL-TypeD (to obtain the spatial RX parameter, i.e., the receive beam). The reference signal of the first TCI state is TRS #1, and the reference signal of the second TCI state is TRS #2.

Each DM-RS port (each of DM-RS port 0 and DM-RS port 1) is simultaneously quasi co-located (i.e. QCLed) with the two TCI states.

PT-RS port 0 is associated with the DM-RS port having the lowest port index among the DM-RS ports assigned for the PDSCH layers (i.e. DM-RS port 0) with the first indicated TCI state, and PT-RS port 1 is associated with the DM-RS port having the lowest port index among the DM-RS ports assigned for the PDSCH layers (i.e. DM-RS port 0) with the second indicated TCI state.

A PT-RS port associated with a DM-RS port with a TCI state means that (1) the PT-RS port applies the same MIMO precoder as used for the DM-RS port, and (2) the PT-RS port is quasi co-located (QCLed) with the reference signal indicated by the TCI state used for the associated DM-RS port with respect to {'QCL-TypeA' and 'QCL-TypeD'}, which means that the PT-RS port can get the Doppler shift, Doppler spread, average delay, delay spread from the estimation of the reference signal and that UE can receive the PT-RS port using the same spatial Rx parameter as that used to receive the reference signal.

Therefore, PT-RS port 0 and PT-RS port 1 are associated with the same DM-RS port but with different QCL assumptions. PT-RS port 0 is associated with DM-RS port 0 and they (PT-RS port 0 and DM-RS port 0) are assumed to be quasi co-located with TRS #1 indicated by the first indicated TCI state used for the associated DM-RS port 0 with respect to {'QCL-TypeA' and 'QCL-TypeD'}. PT-RS port 1 is associated with DM-RS port 0 and they (PT-RS port 1 and DM-RS port 0) are assumed to be quasi co-located with TRS #2 indicated by the second indicated TCI state used for the associated DM-RS port 0 with respect to {'QCL-TypeA' and 'QCL-TypeD'}.

Accordingly, the UE obtains the QCL-TypeA and QCL-TypeD parameters according to TRS #1 when receiving PT-RS port 0, and obtains the QCL-TypeA and QCL-TypeD parameters according to TRS #2 when receiving PT-RS port 1.

PT-RS ports are mapped to resource elements within the RB containing PT-RS by the following equation:

$$k = k_{ref}^{RE} + (iK_{PT-RS} + k_{ref}^{RB})N_{sc}^{RB}$$

$$k_{ref}^{RB} = \begin{cases} n_{RNTI} \bmod K_{PT-RS} & \text{if } N_{RB} \bmod K_{PT-RS} = 0 \\ n_{RNTI} \bmod (N_{RB} \bmod K_{PT-RS}) & \text{otherwise} \end{cases}$$

where i=0, 1, 2, ... ; $K_{PT-RS} \in \{2, 4\}$ is the frequency density of all PT-RS ports which is configured by RRC signaling; $N_{sc}^{RB}=12$; $n_{RNTI}$ is the RNTI associated with the DCI scheduling the PDSCH transmission; and $N_{RB}$ is the number of resource blocks scheduled. It can be seen that, except for parameter $k_{ref}^{RE}$, other parameters are the same for different PT-RS ports.

The parameter $k_{ref}^{RE}$ is determined by the DM-RS port associated with the PT-RS port according to the following table:

TABLE

The parameter $k_{ref}^{RE}$

| DM-RS port | DM-RS Configuration type 1 resourceElementOffset | | | | DM-RS Configuration type 2 resourceElementOffset | | | |
|---|---|---|---|---|---|---|---|---|
| p | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

The DM-RS configuration type (type 1 or type 2) and the offset (offset00 or offset01 or offset10 or offset11) are preconfigured to the UE by RRC signaling. Therefore, the parameter $k_{ref}^{RE}$ is determined by one of the DM-RS port numbering p. To make two PT-RS ports have different resource elements, two DM-RS ports having different port numberings should be determined for the two PT-RS ports.

As described above, PT-RS port 0 and PT-RS port 1 are associated with the same DM-RS port (i.e. the DM-RS port having the lowest port index among the DM-RS ports assigned for the two PDSCH layers) for obtaining the QCL-TypeA and QCL-TypeD parameters. When determining the resource elements for different PT-RS ports, the DM-RS ports for determining the parameter $k_{ref}^{RE}$ should be determined differently for the two PT-RS ports. In particular, according to the first embodiment, the parameter $k_{ref}^{RE}$ for PT-RS port 0 is determined by the associated DM-RS port, i.e., the DM-RS port having the lowest port index among the DM-RS ports assigned for the two PDSCH layers (DM-RS port 0 in FIG. 2). The parameter $k_{ref}^{RE}$ for PT-RS port 1 is determined by the DM-RS port having the second lowest port index among the DM-RS ports assigned for the two PDSCH layers (DM-RS port 1 in FIG. 2).

The parameter $k_{ref}^{RE}$ for PT-RS port 1 may be determined by an alternative way. One CDM group contains two DM-RS ports. For example, DM-RS ports 0 and 1 belong to one CDM group; DM-RS ports 2 and 3 belong to one CDM group; and DM-RS ports 4 and 5 belong to one CDM group.

According to the alternative way, the DM-RS port having the lowest port index among the DM-RS ports assigned for the PDSCH layers is used to determine the parameter $k_{ref}^{RE}$ for PT-RS port 0, and the other DM-RS port that is within the same CDM group as the DM-RS port having the lowest port index among the DM-RS ports assigned for the PDSCH layers is used to determine the parameter $k_{ref}^{RE}$ for PT-RS port 1.

As a whole, according to the first embodiment, PT-RS port 0 and PT-RS port 1 are associated with the same DM-RS port (i.e. the DM-RS port having the lowest port index among the DM-RS ports assigned for the two PDSCH layers). When determining the resource elements for PT-RS port 0 and PT-RS port 1, two different DM-RS ports are used to determine the parameter $k_{ref}^{RE}$ for PT-RS port 0 and PT-RS port 1. In particular, the DM-RS port having the lowest port index among the DM-RS ports assigned for the two PDSCH layers is used to determine the parameter $k_{ref}^{RE}$ for PT-RS port 0, the DM-RS port having the second lowest port index among the DM-RS ports assigned for the two PDSCH layers, or the other DM-RS port that is within the same CDM group as the DM-RS port having the lowest port index among the DM-RS ports assigned for the two PDSCH layers is used to determine the parameter $k_{ref}^{RE}$ for PT-RS port 1.

The same determination applies to the condition that n (n is three or multiple (up to six)) DM-RS ports are assigned for n PDSCH layers. Among the assigned n (n is any one of 3 to 6) DM-RS ports, PT-RS port 0 and PT-RS port 1 are associated with same DM-RS port (i.e. the DM-RS port having the lowest port index among the DM-RS ports assigned for the n PDSCH layers) with the first indicated TCI state and the second indicated TCI state, respectively; the DM-RS port having the lowest port index among the DM-RS ports assigned for the n PDSCH layers is the DM-RS port to determine the parameter $k_{ref}^{RE}$ for PT-RS port 0; and the DM-RS port having the second lowest port index among the DM-RS ports assigned for the n PDSCH layers or the other DM-RS port that is within the same CDM group as the DM-RS port having the lowest port index among the DM-RS ports assigned for the n PDSCH layers is the DM-RS port to determine the parameter $k_{ref}^{RE}$ for PT-RS port 1.

Figure 3:
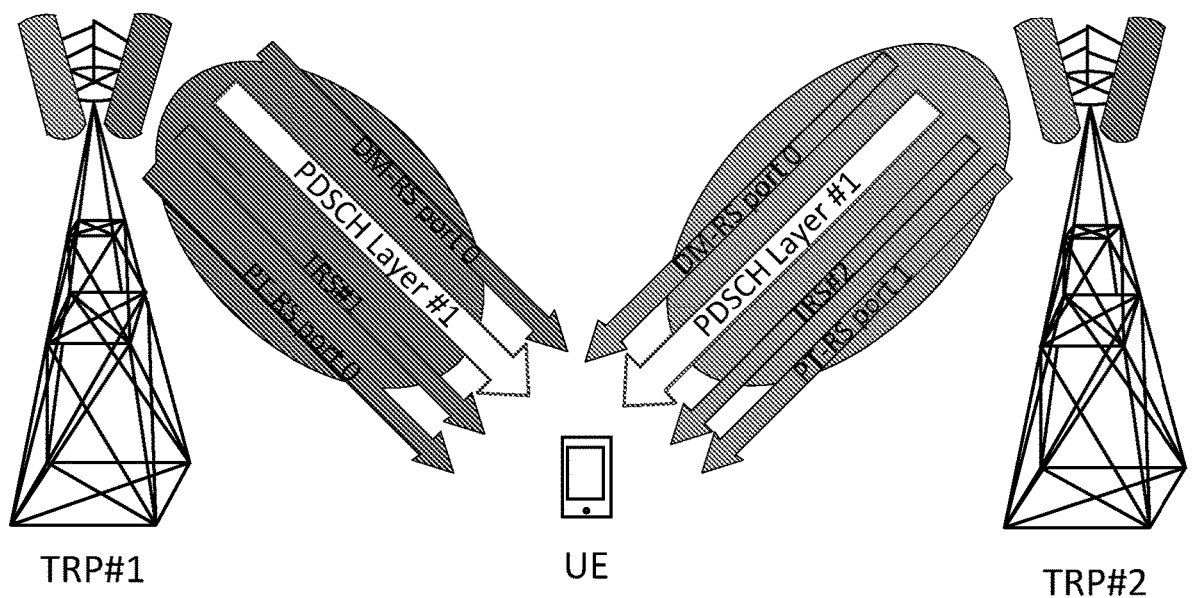
FIG. 3 illustrates an example of the second embodiment.

In a second embodiment shown in FIG. 3, SFN DM-RS scheme is adopted, and the number of scheduled PDSCH layer is one.

The second embodiment differs from the first embodiment in that, since the number of scheduled PDSCH layer is one, the assigned DM-RS port is only one (e.g. DM-RS port 0). On the other hand, similar to the first embodiment, in the second embodiment, in the scenario of two TRPs, two PT-RS ports (e.g. PT-RS port 0 and PT-RS port 1) are configured, and two TRSs (e.g. TRS #1 and TRS #2) are configured.

According to the first embodiment, PT-RS port 0 and PT-RS port 1 are associated with same DM-RS port (i.e. the DM-RS port having the lowest port index among the DM-RS ports assigned for the PDSCH layers). According to the second embodiment, since there is only one assigned DM-RS port, PT-RS port 0 and PT-RS port 1 are associated with the one assigned DM-RS port, i.e. DM-RS port 0 shown in FIG. 3.

Two TCI states are indicated for the one assigned DM-RS port. Each TCI state includes a reference signal for both QCL-TypeA (to obtain the Doppler shift, Doppler spread, average delay and delay spread) and QCL-TypeD (to obtain the spatial RX parameter, i.e., the receive beam). The reference signal of a first TCI state is TRS #1, and the reference signal of a second TCI state is TRS #2. The one assigned DM-RS port is simultaneously quasi co-located (i.e. QCLed) with the two TCI states.

PT-RS port 0 is associated with the one assigned DM-RS port (DM-RS port 0) with the first indicated TCI state, and PT-RS port 1 is associated with the one assigned DM-RS port (DM-RS port 0) with the second indicated TCI state. Accordingly, the UE obtains the QCL-TypeA and QCL-TypeD parameters according to TRS #1 when receiving PT-RS port 0, and obtains the QCL-TypeA and QCL-TypeD parameters according to TRS #2 when receiving PT-RS port 1.

According to the second embodiment, since there is only one assigned DM-RS port, the one assigned DM-RS port can be used to determine the parameter $k_{ref}^{RE}$ for one PT-RS port, e.g. for PT-RS port 0. On the other hand, the DM-RS port used to determine the parameter $k_{ref}^{RE}$ for the other PT-RS port, e.g., PT-RS port 1, can be the other DM-RS port that is within the same CDM group as the one assigned DM-RS port. For example, if the one assigned DM-RS port is DM-RS port 0 (that is used to determine the parameter $k_{ref}^{RE}$ for PT-RS port 0), DM-RS port 1, that is within the same CDM group as DM-RS port 0 used to determine the parameter $k_{ref}^{RE}$ for PT-RS port 1.

In a third embodiment, non-SFN DM-RS scheme is adopted, and the number of scheduled PDSCH layers can be one or multiple (up to six).

Figure 4:
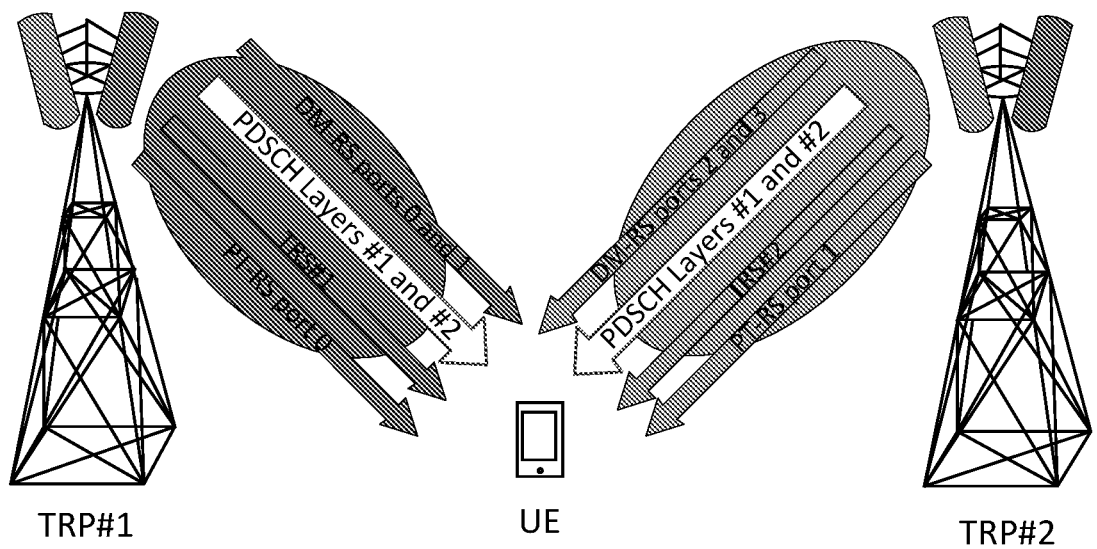
FIG. 4 illustrates an example of the third embodiment.

The third embodiment is described by example of two PDSCH layers (e.g. PDSCH layer #1 and PDSCH layer #2) being scheduled, with reference to FIG. 4.

As shown in FIG. 4, two PDSCH layers (e.g. PDSCH layer #1 and PDSCH layer #2) are scheduled. Each PDSCH layer (PDSCH layer #1 or PDSCH layer #2) is transmitted from different TRPs (TRP #1 and TRP #2). Since non-SFN DM-RS scheme is adopted, orthogonal DM-RS ports are transmitted from TRP #1 and TRP #2 respectively for independent channel estimation. That is, two DM-RS ports (DM-RS port 0 and DM-RS port 1) are assigned for the two PDSCH layers (PDSCH layer #1 and PDSCH layer #2) transmitted from TRP #1, while another two DM-RS ports (DM-RS ports 2 and DM-RS port 3) are assigned for the two PDSCH layers (PDSCH layer #1 and PDSCH layer #2) transmitted from TRP #2.

According to the third embodiment, in non-SFN DM-RS scheme, one PDSCH layer (PDSCH layer #1 or PDSCH layer #2) transmitted from different TRPs (e.g. two TRPs) are associated with different DM-RS ports. That is, PDSCH layer #1 from TRP #1 is associated with DM-RS port 0; PDSCH layer #2 from TRP #1 is associated with DM-RS port 1; PDSCH layer #1 from TRP #2 is associated with DM-RS port 2; and PDSCH layer #2 from TRP #2 is associated with DM-RS port 3.

Two different TCI states (a first TCI state and a second TCI state) are indicated. The first TCI state includes TRS #1 as a reference signal for both QCL-TypeA and QCL-TypeD parameters for the DM-RS port(s) transmitted by TRP #1. The second TCI state includes TRS #2 as a reference signal for both QCL-TypeA and QCL-TypeD parameters for the DM-RS port(s) transmitted by TRP #2.

The DM-RS ports (DM-RS port 0 and DM-RS port 1) assigned for the two PDSCH layers (PDSCH layer #1 and PDSCH layer #2) transmitted from TRP #1 are associated with the first TCI state. The DM-RS ports (DM-RS port 2 and DM-RS port 3) assigned for the two PDSCH layers (PDSCH layer #1 and PDSCH layer #2) transmitted from TRP #2 are associated with the second TCI state.

PT-RS port 0 is associated with the DM-RS port having the lowest port index among the DM-RS ports assigned for the PDSCH layers associated with the first indicated TCI state, that is DM-RS port 0 in FIG. 4. PT-RS port 1 is associated with the DM-RS port having the lowest port index among the DM-RS ports assigned for the PDSCH layers associated with the second indicated TCI state, that is DM-RS port 2 in FIG. 4.

Since different DM-RS ports (DM-RS ports 0 and 2) are associated with different PT-RS ports (PT-RS ports 0 and 1), different $k_{ref}^{RE}$ values for different PT-RS ports can be determined by different associated DM-RS ports. So, different PT-RS ports are mapped to different resource elements within the RB containing PT-RS.

Although the third embodiment described above with reference to FIG. 4 is by example of two PDSCH layers being scheduled, the third embodiment can apply to n (n is any one of 1 to 6) scheduled PDSCH layers. For each of two TRPs, n DM-RS ports are assigned for n PDSCH layers. PT-RS port 0 is associated with the DM-RS port having the lowest port index among the assigned n DM-RS port(s) associated with TRP #1 (i.e. with the first TCI state); and PT-RS port 1 is associated with the DM-RS port having the lowest port index among the assigned n DM-RS port(s) associated with TRP #2 (i.e. with the second TCI state). The DM-RS port associated with PT-RS port 0 is the DM-RS port to determine the parameter $k_{ref}^{RE}$ for PT-RS port 0, and the DM-RS port associated with PT-RS port 1 is the DM-RS port to determine the parameter $k_{ref}^{RE}$ for PT-RS port 1.

In all of the above embodiments, two PT-RS ports can be supported for SFN based PDSCH transmission in a scenario of two TRPs. The association between PT-RS ports and DM-RS ports is proposed in detail with proper QCL assumption. In addition, RE mappings for the two PT-RS ports in both SFN DM-RS scheme and non-SFN DM-RS scheme are determined differently. With the determined QCL assumptions and the determined RE mappings of the two PT-RS ports, the UE can receive the two PT-RS ports properly. Similarly, the gNB can transmit the two PT-RS ports properly.

Figure 5:
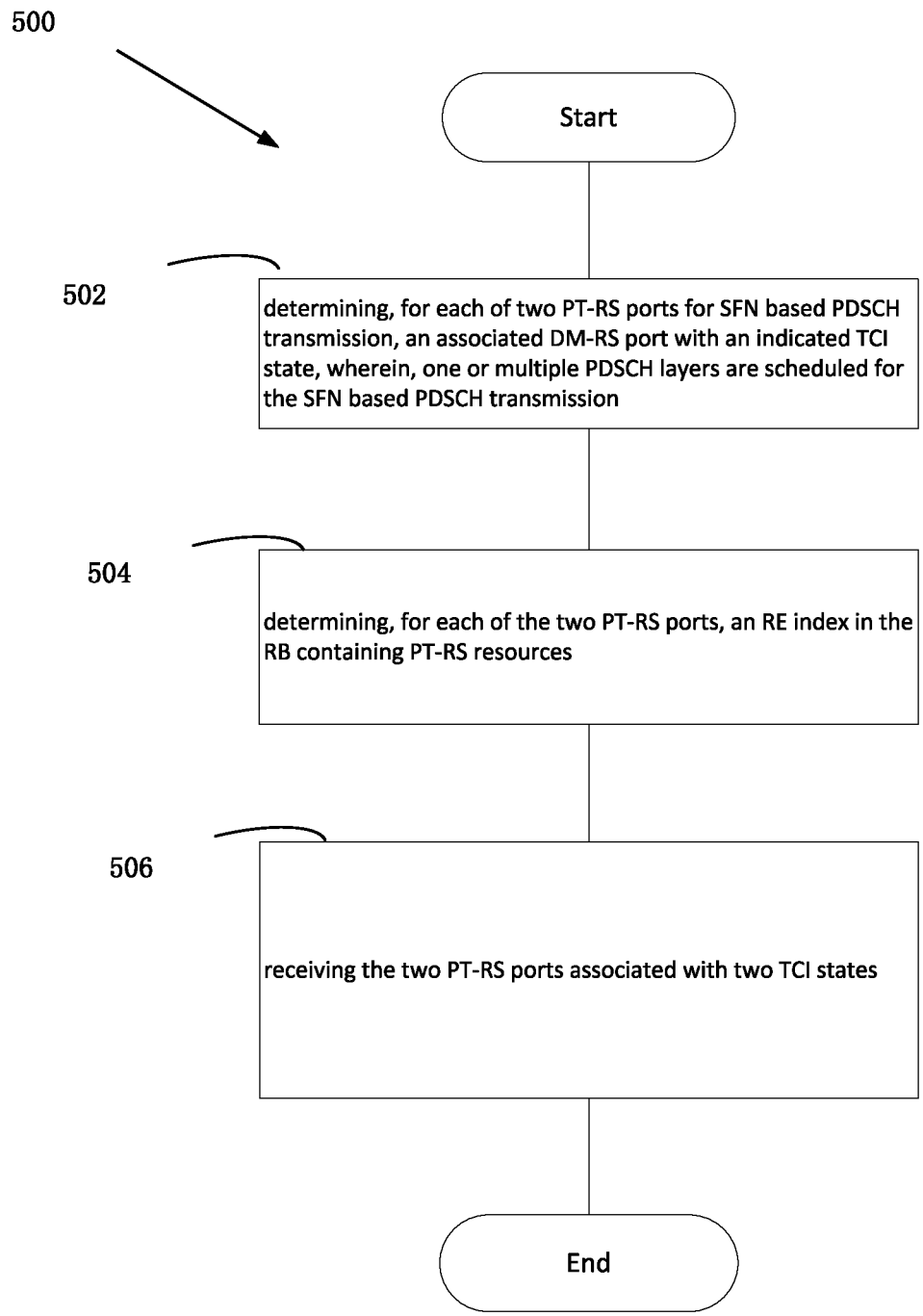
FIG. 5 is a schematic flow chart diagram illustrating an embodiment of a method.

FIG. 5 is a schematic flow chart diagram illustrating an embodiment of a method 500 according to the present application. In some embodiments, the method 500 is performed by an apparatus, such as a remote unit. In certain embodiments, the method 500 may be performed by a processor executing program code, for example, a microcontroller, a microprocessor, a CPU, a GPU, an auxiliary processing unit, a FPGA, or the like.

The method 500 may include 502 determining, for each of two PT-RS ports for SFN based PDSCH transmission, an associated DM-RS port with an indicated TCI state, wherein, one or multiple PDSCH layers are scheduled for the SFN based PDSCH transmission; 504 determining, for each of the two PT-RS ports, an RE index in the RB containing PT-RS resources; and 506 receiving the two PT-RS ports associated with two TCI states. The steps 502 and 504 can be performed in any sequence or may be performed simultaneously. When the associated DM-RS port and the RE index are determined for each of the two PT-RS ports, the two PT-RS ports associated with two TCI states can be received appropriately by a remote unit.

Figure 6:
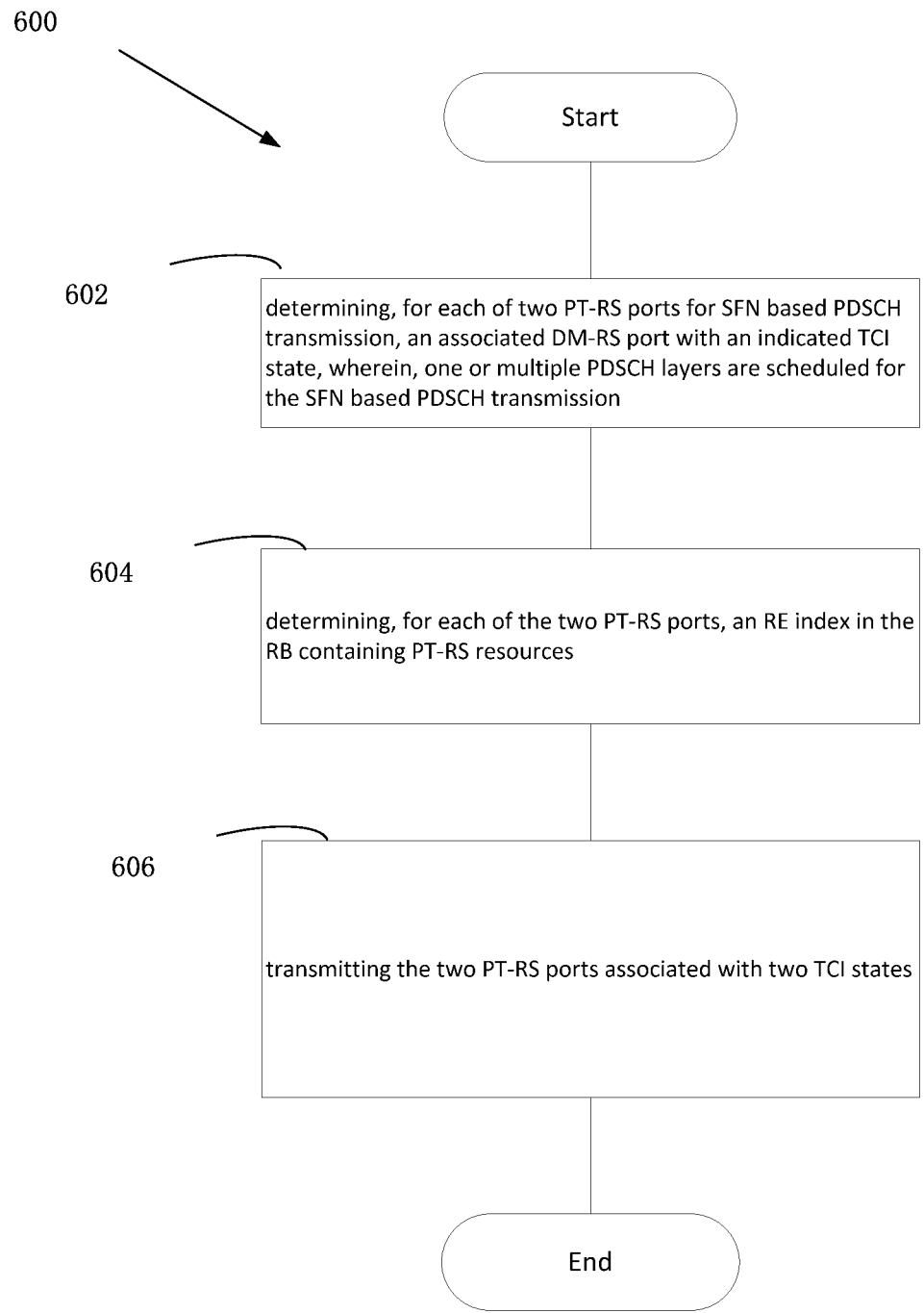
FIG. 6 is a schematic flow chart diagram illustrating a further embodiment of a method.

FIG. 6 is a schematic flow chart diagram illustrating an embodiment of a method 400 according to the present application. In some embodiments, the method 600 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 600 may include 602 determining, for each of two PT-RS ports for SFN based PDSCH transmission, an associated DM-RS port with an indicated TCI state, wherein, one or multiple PDSCH layers are scheduled for the SFN based PDSCH transmission; 604 determining, for each of the two PT-RS ports, an RE index in the RB containing PT-RS resources; and 606 transmitting the two PT-RS ports associated with two TCI states. The steps 602 and 604 can be performed in any sequence or may be performed simultaneously. When the associated DM-RS port and the RE index are determined for each of the two PT-RS ports, the two PT-RS ports associated with two TCI states can be transmitted appropriately by a base unit.

Figure 7:
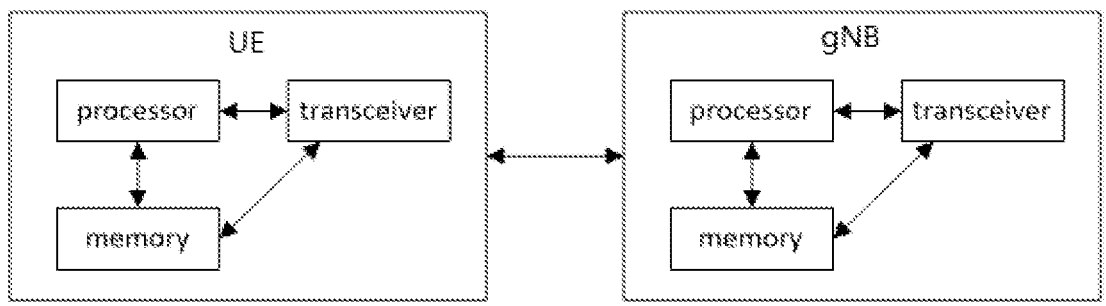
FIG. 7 is a schematic block diagram illustrating apparatuses according to one embodiment.

FIG. 7 is a schematic block diagram illustrating apparatuses according to one embodiment.

Referring to FIG. 7, the UE (i.e. the remote unit) includes a processor, a memory, and a transceiver. The processor implements a function, a process, and/or a method which are proposed in FIG. 5. The gNB (i.e. base unit) includes a processor, a memory, and a transceiver. The processors implement a function, a process, and/or a method which are proposed in FIG. 6. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

determining, for each of two phase tracking reference signal (PT-RS) ports for single frequency network (SFN) based physical downlink shared channel (PDSCH) transmission, an associated demodulation reference signal (DM-RS) port with an indicated transmission configuration indication (TCI) state, wherein one or multiple PDSCH layers are scheduled for the SFN based PDSCH transmission;

determining, for each of the two PT-RS ports, a resource element (RE) index in a resource block (RB) containing PT-RS resources, wherein the RE index is determined based on a lowest port index among DM-RS ports associated with corresponding PDSCH layers; and receiving the two PT-RS ports associated with two TCI states.

2. The method of claim 1, wherein, when the associated DM-RS port is associated with one indicated TCI state, a first PT-RS port in the two PT-RS ports is associated with the DM-RS port having the lowest port index among the DM-RS port(s) assigned for the one or multiple PDSCH layers associated with a first indicated TCI state, a second PT-RS port in the two PT-RS ports is associated with the DM-RS port having the lowest port index among the DM-RS port(s) assigned for the one or multiple PDSCH layers associated with a second indicated TCI state.

3. The method of claim 1, wherein, when the associated DM-RS port is associated with two indicated TCI states, a first PT-RS port and a second PT-RS port in the two PT-RS ports are both associated with the DM-RS port having the lowest port index among the DM-RS port(s) assigned for the one or multiple PDSCH layers, the first PT-RS port and the associated DM-RS port are assumed to be quasi co-located with respect to {'QCL-TypeA' and 'QCL-TypeD'} indicated by a first TCI state in the two indicated TCI states, and the second PT-RS port and the associated DM-RS port are assumed to be quasi co-located with respect to {'QCL-TypeA' and 'QCL-TypeD'} indicated by a second TCI state in the two indicated TCI states.

4. The method of claim 3, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by the DM-RS port having a second lowest port index among the DM-RS ports assigned for the two or multiple PDSCH layers.

5. The method of claim 3, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by a DM-RS port within the same CDM group as the DM-RS port having the lowest port index among the DM-RS ports assigned for the two or multiple PDSCH layers.

6. The method of claim 3, wherein, when one PDSCH layer is scheduled, the RE index for a first PT-RS port in the two PT-RS ports is determined by the DM-RS port assigned for the one PDSCH layer, and the RE index for a second PT-RS port in the two PT-RS ports is determined by a DM-RS port within the same CDM group as the DM-RS port assigned for the one PDSCH layer.

7. A user equipment (UE), comprising:
at least one memory; and
at least one processor coupled with the at least one memory and configured to cause the UE to:
determine, for each of two phase tracking reference signal (PT-RS) ports for single frequency network (SFN) based physical downlink shared channel (PDSCH) transmission, an associated demodulation reference signal (DM-RS) port with an indicated transmission configuration indication (TCI) state, wherein one or multiple PDSCH layers are scheduled for the SFN based PDSCH transmission;
determine, for each of the two PT-RS ports, a resource element (RE) index in a resource block (RB) containing PT-RS resources, wherein the RE index is determined based on a lowest port index among DM-RS ports associated with corresponding PDSCH layers; and
receive the two PT-RS ports associated with two TCI states.

8. The UE of claim 7, wherein, when the associated DM-RS port is associated with one indicated TCI state, a first PT-RS port in the two PT-RS ports is associated with the DM-RS port having the lowest port index among the DM-RS port(s) assigned for the one or multiple PDSCH layers associated with a first indicated TCI state, a second PT-RS port in the two PT-RS ports is associated with the DM-RS port having the lowest port index among the DM-RS port(s) assigned for the one or multiple PDSCH layers associated with a second indicated TCI state.

9. The UE of claim 8, wherein, the RE index for a first PT-RS port in the two PT-RS ports is determined by the DM-RS port having the lowest port index among the DM-RS port(s) assigned for the one or multiple PDSCH layers associated with the first indicated TCI state, and the RE index for a second PT-RS port in the two PT-RS ports is determined by the DM-RS port having the lowest port index among the DM-RS port(s) assigned for the one or multiple PDSCH layers associated with the second indicated TCI state.

10. The UE of claim 7, wherein, when the associated DM-RS port is associated with two indicated TCI states, a first PT-RS port and a second PT-RS port in the two PT-RS ports are both associated with the DM-RS port having the lowest port index among the DM-RS port(s) assigned for the one or multiple PDSCH layers, the first PT-RS port and the associated DM-RS port are assumed to be quasi co-located with respect to {'QCL-TypeA' and 'QCL- TypeD'} indicated by a first TCI state in the two indicated TCI states, and the second PT-RS port and the associated DM-RS port are assumed to be quasi co-located with respect to {'QCL-TypeA' and 'QCL-TypeD'} indicated by a second TCI state in the two indicated TCI states.

11. The UE of claim 10, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by the DM-RS port having a second lowest port index among the DM-RS ports assigned for the two or multiple PDSCH layers.

12. The UE of claim 10, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by a DM-RS port within the same CDM group as the DM-RS port having the lowest port index among the DM-RS ports assigned for the two or multiple PDSCH layers.

13. The UE of claim 10, wherein, when one PDSCH layer is scheduled, the RE index for a first PT-RS port in the two PT-RS ports is determined by the DM-RS port assigned for the one PDSCH layer, and the RE index for a second PT-RS port in the two PT-RS ports is determined by a DM-RS port within the same CDM group as the DM-RS port assigned for the one PDSCH layer.

14. A base station, comprising:
at least one memory; and
at least one processor coupled with the at least one memory and configured to cause the base station to:
determine, for each of two phase tracking reference signal (PT-RS) ports for single frequency network (SFN) based physical downlink shared channel (PDSCH) transmission, an associated demodulation reference signal (DM-RS) port with an indicated transmission configuration indication (TCI) state, wherein one or multiple PDSCH layers are scheduled for the SFN based PDSCH transmission;
determine, for each of the two PT-RS ports, a resource element (RE) index in a resource block (RB) containing PT-RS resources, wherein the RE index is determined based on a lowest port index among DM-RS ports associated with corresponding PDSCH layers; and
transmit the two PT-RS ports associated with two TCI states.

15. The base station of claim 14, wherein, when the associated DM-RS port is associated with one indicated TCI state, a first PT-RS port in the two PT-RS ports is associated with the DM-RS port having the lowest port index among the DM-RS port(s) assigned for the one or multiple PDSCH layers associated with a first indicated TCI state, a second PT-RS port in the two PT-RS ports is associated with the DM-RS port having the lowest port index among the DM-RS port(s) assigned for the one or multiple PDSCH layers associated with a second indicated TCI state.

16. The base station of claim 15, wherein, the RE index for a first PT-RS port in the two PT-RS ports is determined by the DM-RS port having the lowest port index among the DM-RS port(s) assigned for the one or multiple PDSCH layers associated with the first indicated TCI state, and the RE index for a second PT-RS port in the two PT-RS ports is determined by the DM-RS port having the lowest port index among the DM-RS port(s) assigned for the one or multiple PDSCH layers associated with the second indicated TCI state.

17. The base station unit of claim 14, wherein, when the associated DM-RS port is associated with two indicated TCI states, a first PT-RS port and a second PT-RS port in the two PT-RS ports are both associated with the DM-RS port having the lowest port index among the DM-RS port(s) assigned for the one or multiple PDSCH layers, the first PT-RS port and the associated DM-RS port are assumed to be quasi co-located with respect to {'QCL-TypeA' and 'QCL-TypeD'} indicated by a first TCI state in the two indicated TCI states, and the second PT-RS port and the associated DM-RS port are assumed to be quasi co-located with respect to {'QCL-TypeA' and 'QCL-TypeD'} indicated by a second TCI state in the two indicated TCI states.

18. The base station of claim 17, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by the DM-RS port having a second lowest port index among the DM-RS ports assigned for the two or multiple PDSCH layers.

19. The base station of claim 17, wherein, when two or multiple PDSCH layers are scheduled, the RE index for a first PT-RS port in the two PT-RS ports is determined by the DM-RS port having the lowest port index among the DM-RS ports assigned for the two or multiple PDSCH layers, and the RE index for a second PT-RS port in the two PT-RS ports is determined by a DM-RS port within the same CDM group as the DM-RS port having the lowest port index among the DM-RS ports assigned for the two or multiple PDSCH layers.

20. The base station of claim 17, wherein, when one PDSCH layer is scheduled, the RE index for a first PT-RS port in the two PT-RS ports is determined by the DM-RS port assigned for the one PDSCH layer, and the RE index for a second PT-RS port in the two PT-RS ports is determined by a DM-RS port within the same CDM group as the DM-RS port assigned for the one PDSCH layer.

* * * * *